United States Patent
Nishinosono et al.

(10) Patent No.: US 7,161,310 B2
(45) Date of Patent: Jan. 9, 2007

(54) BACKLIGHT APPARATUS FOR LIQUID CRYSTAL DISPLAY

(75) Inventors: Kazuo Nishinosono, Osaka (JP); Hitoshi Miyamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 147 days.

(21) Appl. No.: 11/020,502

(22) Filed: Dec. 23, 2004

(65) Prior Publication Data
US 2005/0140312 A1 Jun. 30, 2005

(30) Foreign Application Priority Data
Dec. 25, 2003 (JP) .............................. 2003-430868

(51) Int. Cl.
*H05B 37/02* (2006.01)
(52) U.S. Cl. ................. 315/291; 315/209 R; 315/276; 315/224; 315/312; 345/102; 345/77; 345/212
(58) Field of Classification Search ............ 315/209 R, 315/291, 224, 276, 278, 279, 312; 345/87, 345/77, 102, 212; 349/65, 70
See application file for complete search history.

(56) References Cited

U.S. PATENT DOCUMENTS

| | | | | |
|---|---|---|---|---|
| 6,636,190 B1 * | 10/2003 | Hirakata et al. | ........... | 345/74.1 |
| 6,822,398 B1 * | 11/2004 | Murr et al. | ............... | 315/169.4 |
| 6,949,893 B1 * | 9/2005 | Higuchi | ....................... | 315/312 |
| 6,956,556 B1 * | 10/2005 | Yajima et al. | ............... | 345/102 |
| 2004/0232854 A1 * | 11/2004 | Chou | .......................... | 315/291 |
| 2005/0047174 A1 * | 3/2005 | Pan et al. | .................... | 362/561 |

FOREIGN PATENT DOCUMENTS

| | | |
|---|---|---|
| JP | 2000-124045 | 4/2000 |
| JP | 2002-43148 | 2/2002 |

* cited by examiner

*Primary Examiner*—Haissa Philogene
(74) *Attorney, Agent, or Firm*—Osha Liang LLP

(57) ABSTRACT

A secondary winding W2 of a step-up transformer of a self-excited inverter 2 is grounded at the midpoint thereof. High-frequency voltages differing in polarity from each other are outputted from both terminals OT1 and OT2 of the secondary winding W2. Two U-shaped cold-cathode tubes L1 and L2 series-connected to each other are provided directly below a liquid crystal panel. One of terminals of the secondary winding W2 is connected to the terminal OT1 through the ballast capacitor C1. The other terminal thereof is connected to the terminal OT2 of the ballast capacitor C2. The connecting point P between the two U-shaped cold-cathode tubes L1 and L2 is ungrounded. Thus, electric currents flowing through the cold-cathode tubes are equal in value to each other.

2 Claims, 2 Drawing Sheets

PRIOR ART

BACKLIGHT APPARATUS FOR LIQUID CRYSTAL DISPLAY

BACKGROUND OF THE INVENTION

1. Field of the Invention

The present invention relates to a backlight apparatus for a liquid crystal display, which has at least two cold-cathode tubes.

2. Description of the Related Art

In recent years, the liquid crystal panels of liquid crystal display apparatuses have been enlarged in size. Further, the back surface of the liquid crystal panel is illuminated with plural (for example, two) cold-cathode tubes thereby to uniformalize the luminance of the screen of the enlarged liquid crystal panel. A lighting system (a backlight apparatus) shown in FIG. 4 is disclosed in JP-A-2000-124045 (on paragraphs [0016] and [0017], and in FIG. 5). The circuit of this backlight apparatus comprises a self-excited inverter 2, ballast capacitors C1 and C2, and cold-cathode tubes L11 and L12. Reference character T designates a step-up transformer, reference character W1 denotes a primary winding of the step-up transformer, reference character WF designates a feedback winding, reference character W2 denotes a secondary winding, reference character W2A designates a first part of the secondary winding, and reference character W2B denotes a second part of the secondary winding. The secondary winding W2 is grounded at the midpoint thereof. An intermediate tap of the primary winding W1 is connected to an input terminal IN through a choke coil L. Reference characters Q1 and Q2 designate push-pull connected transistors, reference character R denotes a bias-resistor, and reference character CC designates a resonance capacitor parallel-connected to the primary winding W1.

One OT1 of terminals of the second winding W2 is connected to one of terminals of the cold-cathode tubes L11 through the ballast capacitor C1. The other terminal of the cold-cathode tube L11 is grounded. Further, the other terminal OT2 of the secondary winding W2 is connected to one of terminals of the cold-cathode tube L12 through the ballast capacitor C2. The other terminal of the cold-cathode tube L12 is grounded.

When a DC voltage rectified by a rectifying circuit (not shown) is inputted to the input terminal IN, high frequency voltages, which differ in polarity from and are equal in value to each other, are generated at both the terminals OT1 and OT2 of the second winding W2. The ballast capacitors C1 and C2 limit electric currents flowing through the cold-cathode tubes L11 and L12, respectively, so as to change the electric currents into constant currents thereby to stabilize the lighting of the cold-cathode tubes L11 and L12. However, in a case where the electromagnetic coupling between the primary winding W1 and the secondary winding W2 is weak (or where the voltages produced at the terminals OT1 and OT2 are low), it is unnecessary to provide the ballast capacitors C1 and C2 in the circuit. Additionally, JP-A-2002-043148 (on FIG. 5) discloses a backlight apparatus similar to that shown in FIG. 4.

SUMMARY OF THE INVENTION

However, in the apparatus disclosed in JP-A-2000-124045, the other terminals of the cold-cathode tubes L11 and L12 are grounded. Thus, in a case where there is a variation in the capacitance values of the ballast capacitors C1 and C2 or in the characteristics of the inverter 2, electric currents flowing through the cold-cathode tubes L1 and L2 differ from each other, and there is a variation in the intensity of light coming from the cold-cathode tubes L1 and L2. Therefore, this apparatus has problems that the liquid crystal panel cannot be illuminated with the same luminance, and that the luminance of the screen of the liquid crystal panel does not become uniform. Incidentally, the influence of the variation in the intensity of light coming from the cold-cathode tubes L1 and L2 is significant in a liquid crystal panel of the directly-below type (that is, a liquid crystal panel of the type having a diffusing plate provided on the back surface of the liquid crystal panel and also having cold-cathode tubes on the rear surface of the diffusing plate), which is higher in the correlation between the intensity of light coming from the cold-cathode tubes L1 and L2 and an amount of light passing through the liquid crystal panel than a liquid crystal panel of the sidelight type.

The invention is accomplished to solve the aforementioned problems. Accordingly, one of objects of the invention is to provide a backlight apparatus for a liquid crystal television, which is enabled to uniformalize the luminance of the screen of the liquid crystal panel of the liquid crystal television, by using two cold-cathode tubes.

According to a first aspect of the invention, there is provided a backlight apparatus for a liquid crystal display having a liquid crystal panel, the backlight apparatus including: a diffusing plate that is to be provided on entirety of the liquid display panel; a first and a second U-shaped cold-cathode tubes provided on a back surface of the diffusing plate and series-connected to each other; and a driver circuit for driving the first and the second U-shaped cold-cathode tubes, the driver circuit including a self-excited inverter for generating high-frequency voltages differing in polarity from each other at both terminals of a secondary winding of a step-up transformer whose midpoint is grounded, wherein the first and the second U-shaped cold-cathode tubes are connected between both terminals of the secondary winding without being interposed by ballast capacitors, and wherein a connecting point between the first and the second U-shaped cold-cathode tubes is ungrounded.

According to a second aspect of the invention, there is provided a backlight apparatus for a liquid crystal display having a liquid crystal panel, the backlight apparatus including: a diffusing plate that is to be provided on entirety of the liquid display panel; a first and a second U-shaped cold-cathode tubes provided on a back surface of the diffusing plate and series-connected to each other; and a driver circuit for driving the first and the second U-shaped cold-cathode tubes, the driver circuit including a self-excited inverter for generating high-frequency voltages differing in polarity from each other at both terminals of a secondary winding of a step-up transformer whose midpoint is grounded, wherein the first and the second U-shaped cold-cathode tubes are connected between both terminals of the secondary winding through ballast capacitors respectively, and wherein a connecting point between the first and the second U-shaped cold-cathode tubes is ungrounded.

BRIEF DESCRIPTION OF THE DRAWINGS

The above objects and advantages of the present invention will become more apparent by describing preferred exemplary embodiments thereof in detail with reference to the accompanying drawings, wherein.

DETAILED DESCRIPTION OF THE PREFERRED EMBODIMENTS

Referring now to the accompanying drawings, a description will be given in detail of preferred embodiments of the invention.

Figure 1:
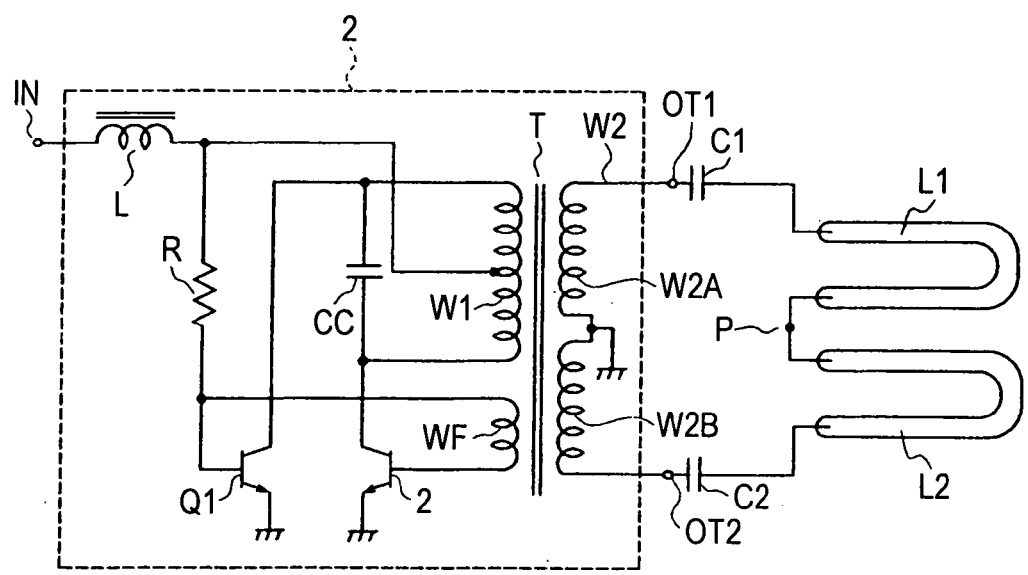
FIG. 1 is a circuit diagram showing a backlight apparatus for a liquid crystal television according to the invention.

FIG. 1 is a circuit diagram showing a backlight apparatus according to the invention for a liquid crystal television. This circuit includes a self-excited inverter 2, ballast capacitors C1 and C2, and two U-shaped cold-cathode tubes L1 and L2 (hereunder referred to simply as "cold-cathode tubes L1 and L2") series-connected to each other. Reference character T designates a step-up transformer that has a primary winding W1, a feedback winding WF, and a secondary winding W2. An intermediate tap of the primary winding W1 is connected to an input terminal IN through a choke coil L. The secondary winding W2 is divided into a first part W2A and a second part W2B. The secondary winding W2 is grounded at the midpoint thereof. Reference characters Q1 and Q2 designate push-pull connected transistors (or switching elements) reference character R denotes a bias-resistor, and reference character CC designates a resonance capacitor parallel-connected to the primary winding W1. One OT1 of terminals of the second winding W2 is connected to one of terminals of the cold-cathode tubes L1 and L2, which are series-connected to each other, through the ballast capacitor C1. The other terminal OT2 of the secondary winding W2 is connected to the other terminal of the cold-cathode tubes L1 and L2, which are series-connected to each other, through the ballast capacitor C2.

When a DC voltage rectified by a rectifying circuit (not shown) is inputted to the input terminal IN, electric current the transistors Q1 and Q2 to alternately conduct in response to electric current from the feedback winding WF. Thus, the inverter 2 self-oscillates and generates a high-frequency voltage in the secondary winding W2 by alternately and intermittently supplying a current, which flows from the intermediate tap to one side of the primary winding W1, and a current flowing from the intermediate tap to the other side thereof. That is, high-frequency voltages, which differ in polarity from and are equal in value to each other, are generated at both the terminals OT1 and OT2 of the secondary winding W2, respectively. The amplitude of each of these high-frequency voltages is, for example, about 1000 V until the cold-cathode tubes L1 and L2 turn on (or are activated), whereas the frequency thereof is, for instance, about 40 kHz to 70 kHz during the tubes turn on. The ballast capacitors C1 and C2 serve to stabilize the lighting of the cold-cathode tubes L1 and L2 by limiting electric currents respectively flowing therethrough. The capacitances of the capacitors are, for example, about several tens pF.

As described above, because the two cold-cathode tubes L1 and L2 are series-connected to each other (or because the connecting point P between both cold-cathode tubes L1 and L2 is not grounded), electric currents respectively flowing through the two cold-cathode tubes L1 and L2 are equal in value to each other. The luminances of the two cold-cathode tubes L1 and L2 are equal to each other. Therefore, the luminances of the two cold-cathode tubes L1 and L2 are equal to each other even in a case where there is a variation in the capacitance values of the ballast capacitors C1 and C2 or in the voltages at both the terminals OT1 and OT2 of the secondary winding. Further, in a case where failures of the inverter 2 or of the cold-cathode tubes L1 and L2 occur, both the cold-cathode tubes L1 and L2 do not turn on. A situation, in which only one thereof turns on, does not occur. Consequently, a state, in which the luminance of the screen of the liquid crystal panel 5 (see FIG. 2) has an intermediate value, does not occur.

Figure 2:
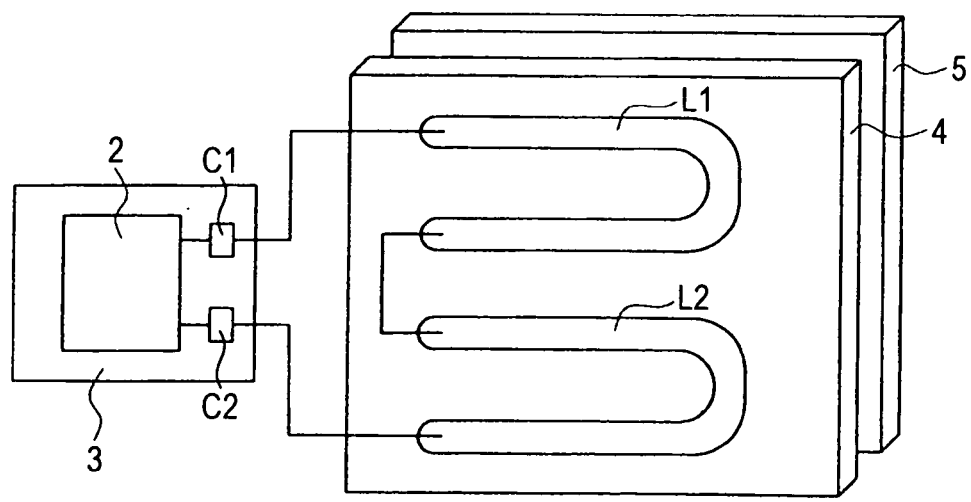
FIG. 2 is a perspective view showing the arrangement of a liquid crystal panel and the backlight apparatus.

FIG. 2 is a perspective view showing the arrangement of the liquid crystal panel 5 of the liquid crystal television and the backlight apparatus. A diffusing plate having substantially the same size as that of the liquid crystal panel 5 is provided on the rear surface (a front side of this figure) of the liquid crystal panel 5 of the liquid crystal television. This diffusing plate 4 diffuses light irradiated from the cold-cathode tubes L1 and L2 to thereby illuminate the liquid crystal panel 5. The two U-shaped cold-cathode tubes L1 and L2 series-connected to each other are juxtaposed in an upward-downward direction on the rear surface of the diffusing plate 4. A reflecting plate (not shown) is provided on the back surface of each of the cold-cathode tubes L1 and L2. One of terminals of a set of the two series-connected cold-cathode tubes L1 and L2 is connected to the inverter through the ballast capacitor C1, while the other terminal of the set of the tubes L1 and L2 is connected to the inverter 2 through the ballast capacitor C2. Reference numeral 3 designates a printed circuit board, on which the inverter 2 and the ballast capacitors C1 and C2 are mounted.

Next, the uniformity of the luminance of the screen of the liquid crystal is described hereinbelow. A liquid crystal monitor for a personal computer, which indicates an icon on a peripheral part of the screen thereof, requires high uniformity of luminance in the entire screen thereof. Conversely, the liquid crystal television does not require the high uniformity of luminance in the entire screen thereof. Thus, even when the luminance of the peripheral part of the screen is slightly lower than that of the central part thereof (this state is referred to as a "substantially uniform" state), this state is tolerated.

According to the invention, the two cold-cathode tubes L1 and L2 are U-shaped. Additionally, the two cold-cathode tubes L1 and L2 are disposed at places set so that the entire liquid crystal panel 5 is illuminated by using the diffusion plate 4. Consequently, the entire liquid crystal panel 5 is substantially uniformly illuminated by the two cold-cathode tubes L1 and L2, so that the luminance of the screen of the liquid crystal panel 5 is substantially uniform.

The aforementioned configuration eliminates the necessity for employing the panel of the sidelight type using an expensive optical waveguide. Further, as shown in FIG. 2, the invention employs the panel of the directly-below type, so that the luminance of the liquid panel 5 can be enhanced. Incidentally, the liquid crystal panel can similarly be illuminated by juxtaposing four cold-cathode tubes of the straight tube type. However, in this case, the cold-cathode tubes are connected to one another by many wires. Thus, high-frequency electric currents leak through the stray capacitances of the wires from the inverter 2. Thus, the luminances of the cold-cathode tubes of the straight rube type are reduced.

As described above, according to the embodiment, there is provided a backlight apparatus for a liquid crystal television, which is adapted to illuminate a liquid crystal panel of the liquid crystal television from a back surface thereof and to drive two cold-cathode tubes by using a self-excited inverter for generating high-frequency voltages differing in polarity from each other at both terminals of a secondary winding of a step-up transformer, whose midpoint is grounded. The backlight apparatus includes a diffusing plate, which is provided on the entirety of the liquid crystal panel, and two U-shaped cold-cathode tubes, which are provided on a back surface of the diffusing plate and series-connected to each other. The two U-shaped cold-cathode tubes series-connected to each other are connected to between both terminals of the secondary winding through ballast capacitors, respectively, and a connecting point between the two U-shaped cold-cathode tubes is ungrounded.

According to the above configuration, electric currents respectively flowing through the two cold-cathode tubes are equal in value to each other. The luminances of the two cold-cathode tubes are equal to each other. Consequently, even when there is a variation in output voltages at both terminals of the secondary winding (that is, output voltages of the inverter), the luminance of the screen of the liquid crystal panel becomes uniform. Further, the two cold-cathode tubes are U-shaped. Consequently, as compared with the case of using four cold-cathode tubes of the straight tube type, the number of wires connecting the cold-cathode tubes is reduced (that is, an interconnection length is decreased). Leak currents flowing through stray capacitances of the wires are reduced. Thus, reduction in the luminance of the cold-cathode tube can be prevented. Furthermore, because the panel of the directly-below type, in which the two U-shaped cold-cathode tubes are provided on the back surface of the diffusing plate, is employed, the luminance of the liquid crystal panel can be enhanced, as compared with that of the sidelight type. Moreover, the luminance thereof can be made to be substantially uniform. As described above, the invention can realize unprecedented effects by using the two U-shaped cold-cathode tubes, which are series-connected to each other, in the backlight apparatus for a liquid crystal television.

Figure 3:
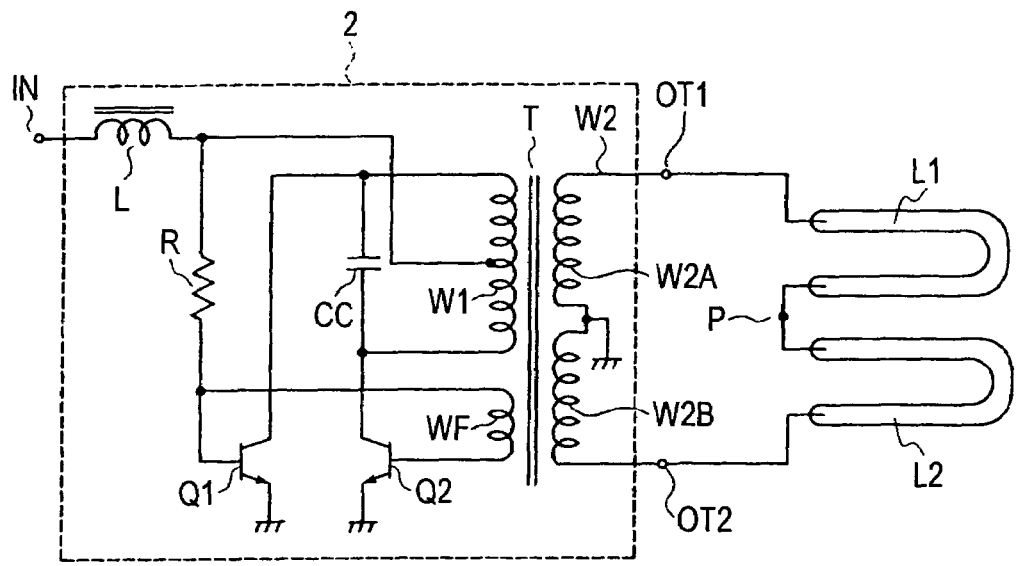
FIG. 3 is a circuit diagram showing a backlight apparatus according to another embodiment.
Figure 4:
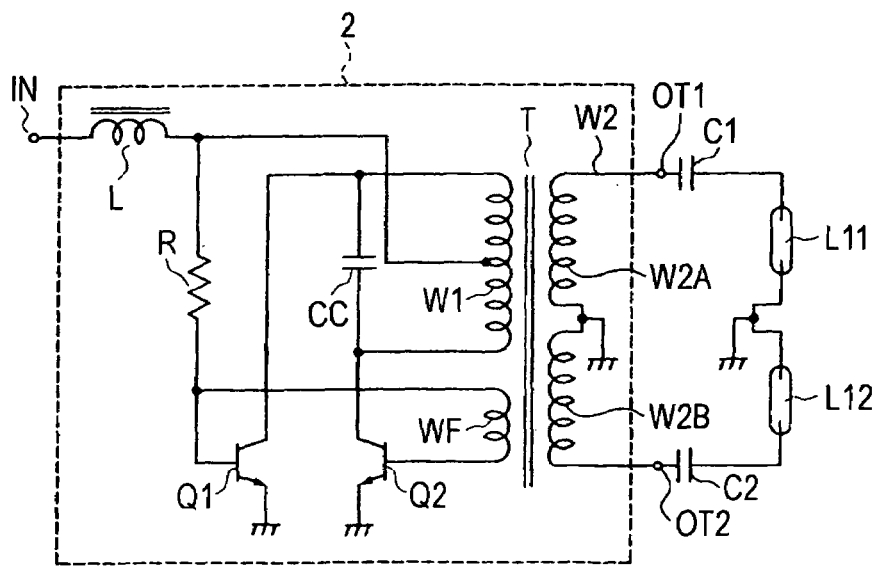
FIG. 4 is a circuit diagram showing a conventional backlight apparatus.

In the embodiment described in the foregoing description, the two U-shaped cold-cathode tubes L1 and L2 series-connected to each other are connected to both the terminals OT1 and OT2 of the secondary winding W2 through the ballast capacitors C1 and C2, respectively. However, as shown in FIG. 3, the cold-cathode tubes may be connected thereto without being interposed by the ballast capacitors between the cold-cathode tubes and the terminals of the secondary winding. In this case, no ballast capacitors interpose therebetween. Thus, the voltages generated at both the terminals of the secondary winding W2 of the step-up transformer can be lowered. Consequently, the cost of the apparatus can be reduced by using a step-up transformer, whose withstand voltage is low. In an embodiment shown in FIG. 3, two cold-cathode tubes L1 and L2 are series-connected to each other. Furthermore, the two cold-cathode tubes are long in tube length and U-shaped. Thus, the load impedance of the secondary winding W2 thereof is higher than that of the secondary winding of the apparatus shown in FIG. 4. Consequently, the lighting of the cold-cathode tubes L1 and L2 does not become unstable, even in a case where ballast capacitors are provided therein.

According to the embodiment, there is provided a backlight apparatus for a liquid crystal television, which is adapted to illuminate a liquid crystal panel of the liquid crystal television from a back surface thereof and to drive two cold-cathode tubes by using a self-excited inverter for generating high-frequency voltages differing in polarity from each other at both terminals of a secondary winding of a step-up transformer, whose midpoint is grounded. The backlight apparatus includes a diffusing plate, which is provided on the entirety of the liquid crystal panel, and two U-shaped cold-cathode tubes, which are provided on a back surface of the diffusing plate and series-connected to each other. The two U-shaped cold-cathode tubes series-connected to each other are connected to between both terminals of the secondary winding, respectively, without being interposed by ballast capacitors between the U-shaped cold-cathode tubes and the terminals of the secondary winding, and a connecting point between the two U-shaped cold-cathode tubes is ungrounded.

According to the above configuration, electric currents respectively flowing through the two cold-cathode tubes are equal in value to each other. The luminances of the two cold-cathode tubes are equal to each other. Consequently, even when there is a variation in output voltages at both terminals of the secondary winding (that is, output voltages of the inverter), the luminance of the screen of the liquid crystal panel becomes uniform. Further, the two cold-cathode tubes are U-shaped. Consequently, as compared with the case of using four cold-cathode tubes of the straight tube type, the number of wires connecting the cold-cathode tubes is reduced (that is, an interconnection length is decreased). Leak currents flowing through stray capacitances of the wires are reduced. Thus, reduction in the luminance of the cold-cathode tube can be prevented. Furthermore, because the panel of the directly-below type, in which the two U-shaped cold-cathode tubes are provided on the back surface of the diffusing plate, is employed, the luminance of the liquid crystal panel can be enhanced, as compared with that of the sidelight type. Moreover, the luminance thereof can be made to be substantially uniform. Furthermore, because the ballast capacitors are not provided therein, the cost of the backlight apparatus can be reduced. Additionally, because a voltage reduction due to the ballast capacitors does not occur, a step-up transformer, whose withstand voltage is low, can be used. Thus, the cost of the step-up transformer can be reduced. As described above, the invention can realize unprecedented effects by using the two U-shaped cold-cathode tubes, which are series-connected to each other, in the backlight apparatus for a liquid crystal television.

Although it has been described in the foregoing description of the embodiments that the two U-shaped cold-cathode tubes L1 and L2 are series-connected to each other, the apparatus may be configured so that three or more U-shaped cold-cathode tubes are series-connected to one another. Furthermore, although the two U-shaped cold-cathode tubes L1 and L2 are juxtaposed in an upward-downward direction in each of the aforementioned embodiments, the cold-cathode tubes may be laterally juxtaposed.

According to the invention, the luminance of the screen of the liquid crystal panel of the liquid crystal television can be uniformalized by using the two U-shaped cold-cathode tubes series-connected to each other.

Although the present invention has been shown and described with reference to a specific preferred embodiment, various changes and modifications will be apparent to those skilled in the art from the teachings herein. Such changes and modifications as are obvious are deemed to come within the spirit, scope and contemplation of the invention as defined in the appended claims.

What is claimed is:

1. A backlight apparatus for a liquid crystal display having a liquid crystal panel, the backlight apparatus comprising:
   a diffusing plate that is to be provided on entirety of the liquid display panel;

a first and a second U-shaped cold-cathode tubes provided on a back surface of the diffusing plate and series-connected to each other; and a driver circuit for driving the first and the second U-shaped cold-cathode tubes, the driver circuit including a self-excited inverter for generating high-frequency voltages differing in polarity from each other at both terminals of a secondary winding of a step-up transformer whose midpoint is grounded, wherein the first and the second U-shaped cold-cathode tubes are connected between both terminals of the secondary winding without being interposed by ballast capacitors, and wherein a connecting point between the first and the second U-shaped cold-cathode tubes is ungrounded.

2. A backlight apparatus for a liquid crystal display having a liquid crystal panel, the backlight apparatus comprising:

a diffusing plate that is to be provided on entirety of the liquid display panel;

a first and a second U-shaped cold-cathode tubes provided on a back surface of the diffusing plate and series-connected to each other; and a driver circuit for driving the first and the second U-shaped cold-cathode tubes, the driver circuit including a self-excited inverter for generating high-frequency voltages differing in polarity from each other at both terminals of a secondary winding of a step-up transformer whose midpoint is grounded, wherein the first and the second U-shaped cold-cathode tubes are connected between both terminals of the secondary winding through ballast capacitors respectively, and wherein a connecting point between the first and the second U-shaped cold-cathode tubes is ungrounded.

* * * * *